Oct. 28, 1952     C. C. W. WILLIAMS     2,615,184
FEEDER FOR SHORT ARTICLES
Filed Dec. 4, 1946     2 SHEETS—SHEET 1
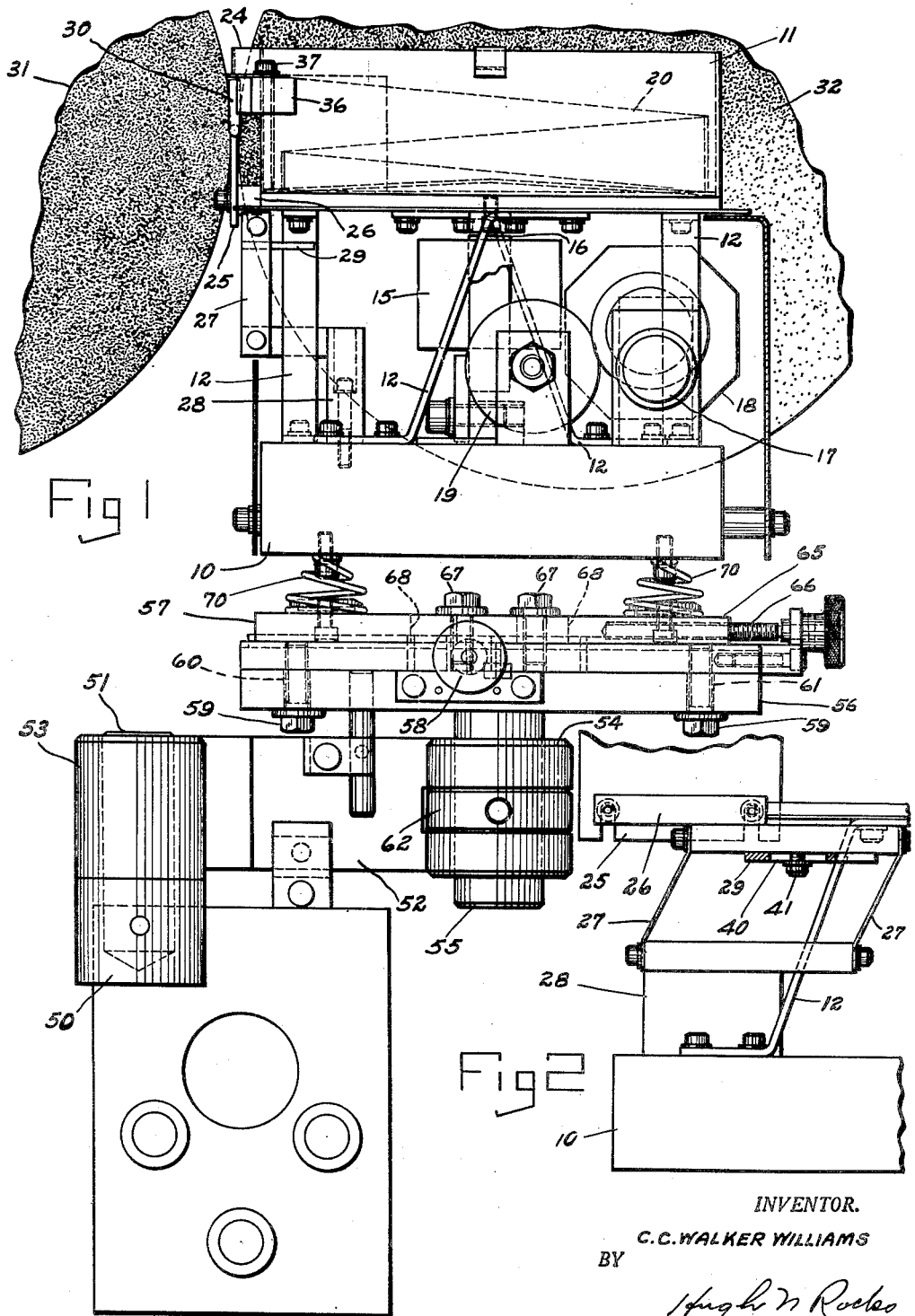
INVENTOR.
C. C. WALKER WILLIAMS
BY
Hugh N Rockes
ATTORNEY

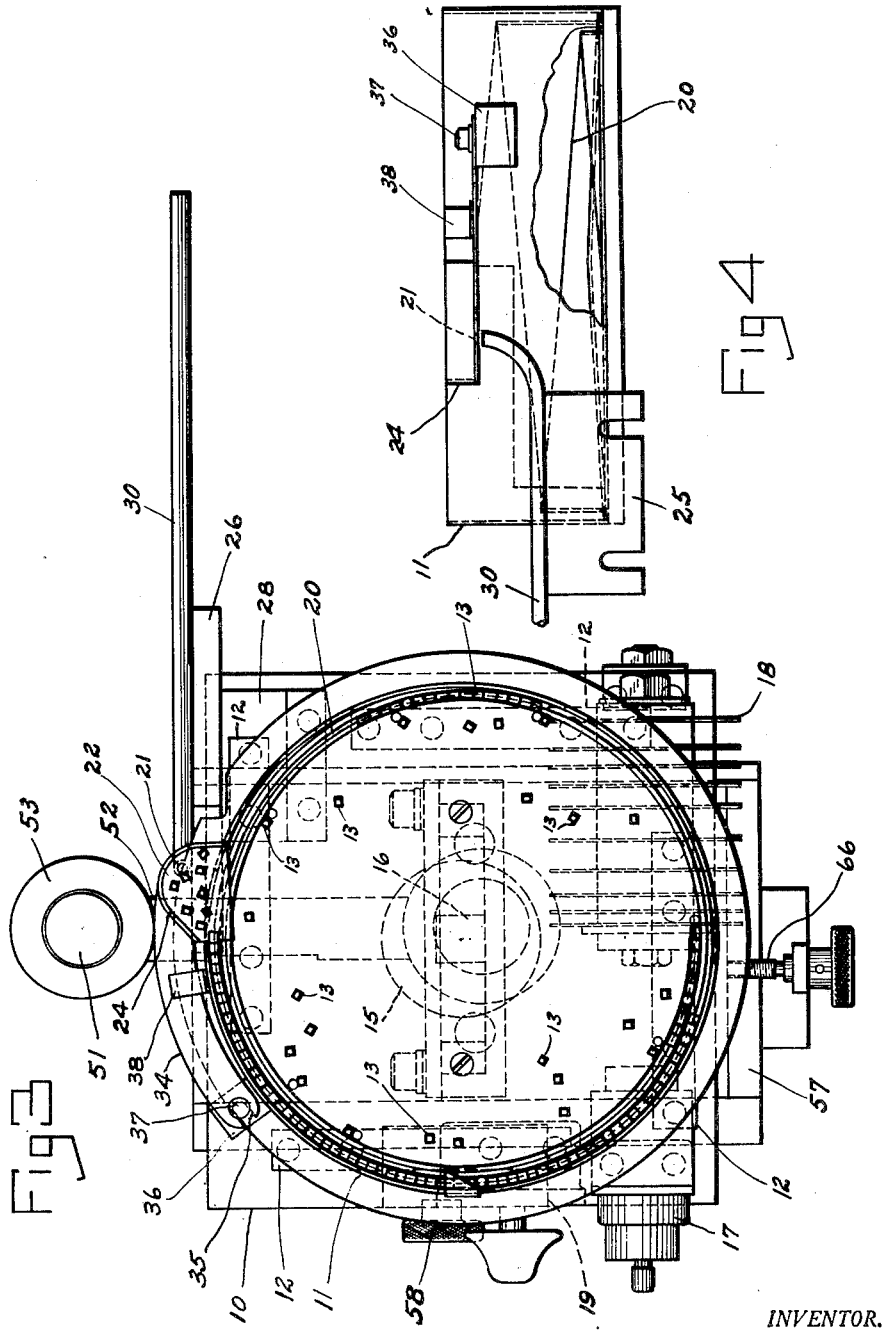

Patented Oct. 28, 1952

2,615,184

UNITED STATES PATENT OFFICE 2,615,184

FEEDER FOR SHORT ARTICLES

Charles C. W. Williams, Waynesboro, Pa., assignor to Landis Tool Company, Waynesboro, Pa.

Application December 4, 1946, Serial No. 714,054

4 Claims. (Cl. 10—164)

This invention relates to an article feeding device for machine tools, packaging devices et cetera but particularly for centerless grinding machines.

Article feeding means for through feed grinding on this type of machine are of two general types: (a) gravity, and (b) horizontally operated devices actuated by a weight or by an electric motor. In most of these devices, the work is supplied in small amounts and in proper position for introduction to the point of operation. Where a hopper is used, a very complicated and bulky mechanism is required to control the flow of articles to the mechanism for transferring them in the proper position to the point of operation.

This invention is concerned particularly with apparatus for loading short articles, for example, those having lengths substantially equal to their diameter. The difficulty in loading this type of article arises from the fact that, unless properly handled, the article is likely to be introduced into the machine crosswise instead of endwise. This problem has been solved by providing a platform in the path of the work, having an opening through which the work passes by gravity. The diameter of this opening is such that the work piece may pass through axially, but not crosswise.

It is an object of this invention to provide means for vibrating the hopper.

A further object is to cause the articles in the hopper to be moved continuously in a substantially circular path.

A further object is to provide a device for removing articles from a hopper in a single line and moving them in an axial direction.

A further object is to provide a device mounted independently of the hopper for conveying articles from the hopper to the point of operation.

A further object is to provide means for controlling the position of work pieces at the entrance of the tube leading to the point of operation.

A further object is to provide an entrance to said tube through which a work piece may enter axially but not laterally.

In the drawings:

Figure 1 is a front elevation of a feeding device.

Figure 2 is an end view of the tube supporting structure.

Figure 3 is a plan view of the device.

Figure 4 is a partial end elevation showing the track on the inside of the hopper.

This invention consists of a base member 10 having means for supporting a circular hopper 11 thereon. Said supporting means consists of a series of resilient members 12 arranged circumferentially about the underside of said hopper and inclined from said base to said hopper in a counter-clockwise direction, or optionally in a clockwise direction. Thus, resilient members spaced circumferentially 90° are inclined in opposite directions and, when deflected, will give the hopper a turning movement about an axis which is substantially fixed.

The means for vibrating said hopper consists of a solenoid 15 mounted with its axis in a vertical position. The core 16 of said solenoid is in alignment with a pad on the bottom of said hopper and spaced therefrom by an amount suitable for operation thereof. Current for energizing said solenoid may be obtained from any A. C. source through a switch 17, rectifier 18 and rheostat 19. The rheostat controls the rate of feed by adjusting the magnitude of the vibrations. The rectifier changes the A. C. to a pulsating or intermittent D. C.

The bottom of said hopper 11 is high at the center and inclines toward the outside. The reason for this is to enable the force of gravity to cooperate with centrifugal force resulting from movement in a circular or curved path in urging articles 13 toward the wall of the hopper.

An inclined track 20 is provided about the inside wall of said hopper. Such a track may be cut or molded in the side walls, or it may be formed of sheet metal and attached thereto. Said track extends nearly to the top of said hopper to a point where the wall is cut away to receive a tubular member 30 leading to a centerless grinding throat formed by abrasive wheels 31 and 32. The width of track 20 is preferably slightly less than the diameter of the work pieces 13. The above-described structure is similar to that disclosed in co-pending application Ser. No. 713,954, also filed December 4, 1946.

The end of tube 30 adjacent the hopper is bent upwardly to an opening 21 in a horizontal platform 22. The surface of said platform extends through the opening in the wall of said hopper and adjacent the end of track 20 and slopes toward an opening 21. The slope of said platform is not enough to cause articles to move toward said opening by gravity alone. The diameter of said opening is slightly greater than that of the work piece to be ground but less than the diagonal of a section through the axis of a work piece having a length equal to its diameter.

Said platform has a side wall 24 to prevent work pieces from falling outside the hopper. The means for supporting said platform in operative position consists of a curved tail-like member 34 extending along the wall of hopper 11 and having an open slot 35 at the end. The tail of said platform is supported on a bracket 36 on the outside of hopper 11 and secured thereto by a clamping screw 37. The open slot makes it possible to change platforms for different work diameters simply by loosening screw 37 instead of removing it entirely. Because of the space between platform 22 and its point of support on bracket 36, the vibration transmitted from the hopper 11 to said platform is considerably amplified. A substantial part of this vibration is in a vertical direction and the work pieces passing from the track 20 to said platform are caused to bounce thereon and thus when they reach the opening 21 they are kept in constant motion until they pass through to tube 30. It will be noted that said tube is not attached to said platform. Since said platform is supported on hopper 11, the tube 30 and platform 22 are vibrated independently.

A flexible bracket 38 on hopper 11 between bracket 36 and platform 22 and above said tail portion serves as a means for dampening the vibration of said platform. The dampening effect may be varied by bending said bracket toward or away from said tail portion, thus varying the pressure exerted on said portion.

A plate 25 welded to tube 30 is removably attached to a block 26. Said block is supported by two parallel flat springs 27 one at each end of block 26. Said springs are mounted on a bracket 28 which in turn is mounted on base 10. An L-shaped plate 29 is secured to the underside of block 26 and has a slot 40 to permit adjustment lengthwise of said block. A screw 41 holds said plate in adjusted position. The purpose of the adjustment is to move the base portion of the L into operative relation with one of the resilient supporting members 12. The vibratory movement of said member resulting from the vibration of hopper 11 is transmitted through plate 29 and block 26 to tube 30. Thus, while said tube is mounted on base 10 it has no other connection with the hopper except the contact between the support member 12 and plate 29 for transmitting vibration to said tube. The tube and hopper may therefore be vibrated independently of one another even though the vibration producing mechanism is common to both.

One means for supporting said article feeding device on a machine consists of a bracket 50 having a short vertical shaft 51 inserted therein. An arm 52 having a cylindrical bearing portion at each end is supported by mounting one of said bearings 53 on shaft 51. The other bearing 54 consisting of spaced upper and lower portions has inserted therein a second vertical shaft 55 having a screw thread thereon (not shown). A nut 62 between said upper and lower portions serves to raise or lower the feed mechanism assembly. A base member 56 is mounted on shaft 55. A member 57 is slidably mounted for adjustment on base 56. Adjustment of said member is effected by turning screw 58 after loosening clamping screws 59 in slots 60 and 61. A second slidable member 65 is mounted on member 56 and adjustable in a direction perpendicular to that of said member 56. This adjustment is effected by means of screw 66. Member 65 is held in adjusted position by screws 67 which pass through slots 68 in said member.

Base 10 and the parts mounted thereon are resiliently supported on slide 65 by coil springs 70.

Operation

Assuming the hopper 11 to be filled with blank work pieces to be fed to a centerless grinder, the solenoid 15 is energized by turning switch 17. Said solenoid exerts an attraction on the bottom of said hopper in a vertical direction. In responding to the solenoid the hopper is guided by resilient members 12. When said hopper moves downwardly attracted by said solenoid, the vertical movement is modified slightly by the action of the resilient members which, because of their inclination, add a horizontal component or turning movement to the vertical movement. The rectified A. C. current is known as pulsating direct current and this current causes vibration by starting and stopping the flow of current to said solenoid at a frequency depending on the frequency of the A. C. source. While solenoid 16 is momentarily deenergized, the resilient members 12 return hopper 11 to its initial position. The resultant effect of the above described operations is to cause the hopper 11 to vibrate in a vertical path and at the same time to have a slight turning movement about its own axis. The effect of this movement on the articles 13, in this case small cylindrical work pieces, is to cause them to circulate in the hopper. The bottom of the hopper is crowned slightly so that the workpieces move to the outside. Those on the outside are caused to move up an inclined track 20 along the wall of the hopper. This track is just wide enough to hold a single work piece.

Work pieces 13 move from track 20 to platform 22. Due to the vibration of the platform said pieces are in a continual state of agitation. Even though they are not in position to enter hole 21 when they reach it, the vibratory movement quickly positions them and they drop into tube 30.

Tube 30 is vibrated in a vertical plane only by virtue of the springs 27 supporting said tube and the contact between one of the hopper supporting members 12 and plate 29. Thus, both angular and rectilinear vibratory movement is effected from a single source of vibration. The angular movement is applied to the hopper and the rectilinear movement to the tube.

One of the principal advantages of this type of feeding mechanism is that it will function just as well with a single article as it will with a hopper full.

I claim:

1. In a device for conveying cylindrical articles of a length substantially equal to the diameter thereof to a point of operation of a machine, a hopper, means for vibrating said hopper to cause said articles to move in a substantially circumferential path, means for moving said articles from said hopper including a spiral track on the wall of the hopper and leading upwardly from the bottom thereof to an elevation above the articles in said hopper, said vibrating means being effective to move said articles along said track, means at the upper end of said track for receiving said articles comprising a platform, an opening in said platform through which articles are moved, means for conducting said articles from said opening to a point of operation, the diameter of said opening being such as to permit entrance of said articles only in an endwise direction, a resilient supporting arm for said platform, one end of said arm being attached to said hopper, said platform being free to vibrate at the other end thereof, said platform being vibrated both vertically and horizontally in response to the vibration of said hopper, and means adjacent said opening but mounted separately from said hopper, and connected to said hopper vibrating means for conducting said articles from said platform to a point of operation.

2. In a device for conveying cylindrical articles of a length substantially equal to the diameter thereof to a point of operation of a machine, a hopper, means for vibrating said hopper to cause said articles to move to a point of discharge, means for receiving said articles as they emerge from the hopper comprising a platform, an opening in said platform through which articles are moved to a point of operation, the diameter of said opening being such as to permit entrance of said articles in an endwise but not in a crosswise position, a resilient supporting arm for said platform, one end of said arm being attached to said hopper, said platform being free to vibrate both vertically and horizontally at the other end thereof, in response to the vibration of said hopper.

3. In a device for conveying cylindrical articles of a length substantialy equal to the diameter thereof to a point of operation of a machine, a hopper, means for vibrating said hopper to cause said articles to move to a point of discharge, means for receiving said articles as they emerge from the hopper comprising a platform, an opening in said platform, means for conducting articles from said opening to said point of operation, the diameter of said opening being such as to permit entrance of articles in an endwise but not in a crosswise position, a resilient supporting arm for said platform, one end of said arm being attached to said hopper, said platform being free to vibrate at the other end thereof, said platform being vibrated both vertically and horizontally in response to the vibration of said hopper whereby said articles are agitated both vertically and horizontally in the vicinity of said opening until they are in position to enter said opening.

4. A device for conveying cylindrical articles of a length substantially equal to the diameter thereof to a point of operation in a machine comprising a platform for receiving said articles, an opening in said platform of a diameter greater than the diameter of said work pieces but not great enough to permit entrance of said articles in a cross-wise position, means for conducting said articles from said opening to said point of operation, means for depositing articles on said platform comprising a vertically disposed cylindrical hopper in which said articles are placed indiscriminately, a track formed on the inside wall of said hopper beginning at the bottom of said hopper and inclining upward in a helical path to said platform, means for vibrating said hopper and resilient means for supporting said hopper and confining the vibration thereof to an inclined arcuate path for causing said articles to move in a circumferential path in said hopper and along said inclined track, said track being wide enough for only a single line of articles whereby to provide a measured but unobstructed flow of said articles to said platform, means for supporting said platform adjacent said hopper for receiving articles from said inclined track, said supporting means comprising a flexible arm connecting said hopper and said platform.

CHARLES C. W. WILLIAMS.

REFERENCES CITED

The following references are of record in the file of this patent:

UNITED STATES PATENTS

| Number | Name | Date |
|---|---|---|
| 133,066 | Stetson | Nov. 12, 1872 |
| 990,593 | Ringland et al. | Apr. 25, 1911 |
| 1,313,990 | Jackson | Aug. 26, 1919 |
| 1,353,136 | Alberti | Sept. 21, 1920 |
| 1,495,610 | Paridon | May 27, 1924 |
| 1,828,662 | Jones | Oct. 20, 1931 |
| 1,862,351 | Hagiwara | June 7, 1932 |
| 2,374,664 | Carrier, Jr. | May 1, 1945 |
| 2,464,216 | Devol | Mar. 15, 1949 |

FOREIGN PATENTS

| Number | Country | Date |
|---|---|---|
| 279,119 | Great Britain | Oct. 15, 1927 |
| 455,256 | Germany | Jan. 28, 1928 |